US010493854B2

(12) United States Patent
Goss et al.

(10) Patent No.: US 10,493,854 B2
(45) Date of Patent: Dec. 3, 2019

(54) CHARGING CABLE FOR AN ELECTRIC OR HYBRID VEHICLE AND CHARGING SYSTEM HAVING SUCH A CHARGING CABLE

(71) Applicant: LEONI KABEL GMBH, Nuremberg (DE)

(72) Inventors: Sebastian Goss, Roth (DE); Roland Schropp, Weissenburg (DE)

(73) Assignee: LEONI Kabel GmbH, Nuremberg (DE)

( * ) Notice: Subject to any disclaimer, the term of this patent is extended or adjusted under 35 U.S.C. 154(b) by 0 days.

(21) Appl. No.: 15/606,156

(22) Filed: May 26, 2017

(65) Prior Publication Data

US 2017/0259676 A1    Sep. 14, 2017

Related U.S. Application Data

(63) Continuation of application No. PCT/EP2015/077841, filed on Nov. 26, 2015.

(30) Foreign Application Priority Data

Nov. 26, 2014   (DE) ........................ 10 2014 224 119

(51) Int. Cl.
*B60L 53/16* (2019.01)
*B60L 11/18* (2006.01)
(Continued)

(52) U.S. Cl.
CPC ........... *B60L 11/1824* (2013.01); *B60L 53/16* (2019.02); *B60L 53/18* (2019.02); *B60L 53/30* (2019.02);
(Continued)

(58) Field of Classification Search
CPC ....................................................... H01B 9/00
(Continued)

(56) References Cited

U.S. PATENT DOCUMENTS 3,942,859 A   3/1976  Korodi
5,416,875 A * 5/1995  Keplinger ........... B29C 47/0016
                                                    362/556
(Continued)

FOREIGN PATENT DOCUMENTS

CH       694442 A5    1/2005
GB      2499570  *    1/2012  ............... H01B 7/36
(Continued)

OTHER PUBLICATIONS

Zeiss United States; Optical Parameters; https://www.zeiss.com/vision-care/en_us/eye-care-professionals/optical-knowledge/optical-basics/optics-the-eye/optical-parameters.html.

*Primary Examiner* — Stanley Tso
(74) *Attorney, Agent, or Firm* — Laurence A. Greenberg; Werner H. Stemer; Ralph E. Locher

(57) ABSTRACT

A charging cable for an electric or hybrid vehicle has a charging line with a number of conductors for conducting a charging current of at least 2 A. An outer sheath surrounds the conductors and a plug can be attached at an end side for connecting the charging line to a current source or to the vehicle. The charging cable has at least one display area on the outer sheath for displaying an operational state. A passive function element is integrated, which extends along the charging cable, which has a coupling point for light at the end side, and which is designed for guiding the light along the charging cable and for scattering the light in a radial direction. A charging system has such a charging cable for connecting a charging station with a vehicle.

22 Claims, 5 Drawing Sheets

US 10,493,854 B2
Page 2

(51) Int. Cl.
  *B60L 53/30* (2019.01)
  *B60L 53/18* (2019.01)
(52) U.S. Cl.
  CPC ........ *Y02T 10/7005* (2013.01); *Y02T 10/7088* (2013.01); *Y02T 90/121* (2013.01); *Y02T 90/14* (2013.01)
(58) Field of Classification Search
  USPC ...................................................... 174/113 R
  See application file for complete search history.

(56) References Cited

U.S. PATENT DOCUMENTS

| | | | | |
|---|---|---|---|---|
| 6,479,607 B1* | 11/2002 | Milan | ................ | C08K 5/0016 |
| | | | | 524/115 |
| 6,577,794 B1 | 6/2003 | Currie et al. | | |
| 6,921,286 B1 | 7/2005 | Fernandez | | |
| 8,167,471 B1 | 5/2012 | Moritz | | |
| 9,075,214 B2 | 7/2015 | Schultheis et al. | | |
| 2002/0185299 A1* | 12/2002 | Giebel | ................ | G02B 6/4482 |
| | | | | 174/110 R |
| 2003/0070831 A1* | 4/2003 | Hudson | ................ | H01B 7/295 |
| | | | | 174/113 R |
| 2005/0124209 A1* | 6/2005 | Currie | ................ | H01R 13/7172 |
| | | | | 439/490 |
| 2005/0259942 A1* | 11/2005 | Temelkuran | ......... | A61B 18/201 |
| | | | | 385/147 |
| 2011/0028619 A1* | 2/2011 | Hill | ....... | C07C 215/12 |
| | | | | 524/153 |
| 2015/0016096 A1* | 1/2015 | Parson | ................ | H02B 1/081 |
| | | | | 362/119 |
| 2015/0144375 A1* | 5/2015 | Hashimoto | .......... | H01B 7/0009 |
| | | | | 174/113 R |
| 2015/0272760 A1* | 10/2015 | Christakis | ............... | A61F 2/966 |
| | | | | 623/1.12 |
| 2015/0342276 A1* | 12/2015 | Yamasaki | ............. | C08G 18/12 |
| | | | | 2/67 |

FOREIGN PATENT DOCUMENTS

| | | |
|---|---|---|
| GB | 2499570 A | 8/2013 |
| WO | 2005106899 A1 | 11/2005 |
| WO | 2013045583 A1 | 4/2013 |

* cited by examiner

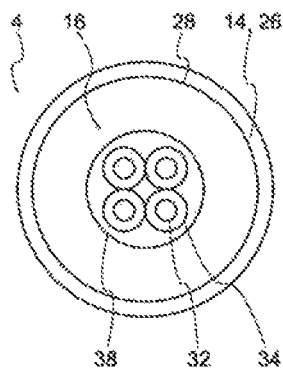
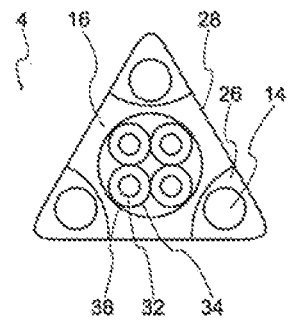
Fig. 3E  Fig. 3F
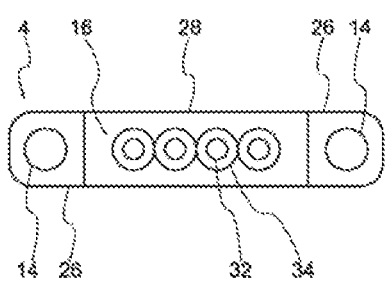
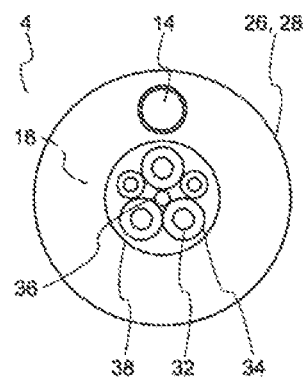
Fig. 3G  Fig. 3H
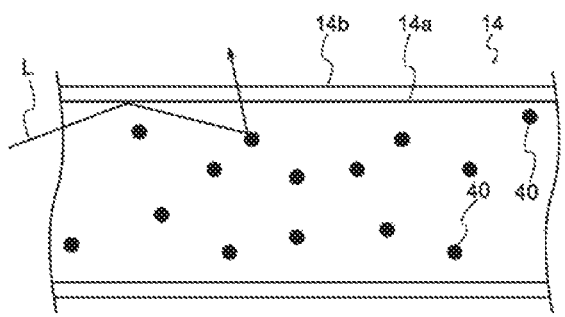
Fig. 4A

CHARGING CABLE FOR AN ELECTRIC OR HYBRID VEHICLE AND CHARGING SYSTEM HAVING SUCH A CHARGING CABLE

CROSS-REFERENCE TO RELATED APPLICATION

This application is a continuation, under 35 U.S.C. § 120, of copending international application No. PCT/EP2015/077841, filed Nov. 26, 2015, which designated the United States; this application also claims the priority, under 35 U.S.C. § 119, of German patent application No. DE 10 2014 224 119.7, filed Nov. 26, 2014; the prior applications are herewith incorporated by reference in their entirety.

BACKGROUND OF THE INVENTION

Field of the Invention

The invention relates to a charging cable for an electric or hybrid vehicle, having a charging line comprising a number of conductors for conducting a charging current of at least 2 A, having an outer sheath surrounding the conductors, and wherein a plug connector can be attached at an end, for the purpose of connecting the charging line to a current source or to the vehicle. Furthermore, the invention relates to a charging system for an electric or hybrid vehicle having such a charging cable.

A corresponding charging cable is described, for example, in German published patent application DE 10 2011 080 455 A1.

The charging cable serves primarily for charging an energy storage device on board an electric or hybrid vehicle, which in the following is also referred to in general as a vehicle, and which is, for example, a car or a bicycle. In this case, a connection is established, by means of the charging cable, for conducting electrical energy between an energy source, which is external to the vehicle, and the energy storage device. The charging cable in this case, in particular owing to the usually high transmitted current intensity and highly diverse application environments, must comply with corresponding safety regulations for use by an end user.

The above-mentioned German publication DE 10 2011 080 455 A1, for example, describes an arrangement for assisting insertion of a plug connector, connected to a cable, into a socket. For this purpose, the arrangement comprises a lamp, which is arranged on or in the plug connector and designed for illuminating the socket.

SUMMARY OF THE INVENTION

It is accordingly an object of the invention to provide a charging cable which overcomes the above-mentioned and other disadvantages of the heretofore-known devices and methods of this general type and which provides for a charging cable, the operating state of which can be determined as easily as possible by an end user and which, in particular, can be produced as simply as possible. It is a further object to provide a charging system having such a charging cable.

With the foregoing and other objects in view there is provided, in accordance with the invention, a charging cable for an electric or hybrid vehicle, the charging cable comprising:

a charging line including a plurality of conductors for conducting a charging current of at least 2 A;

an outer sheath surrounding said conductors, said outer sheath having at least one indicating region;

a cable end for attachment of a plug connector connecting the charging line to a current source or to the vehicle; and a passive function element for indicating an operating state integrated into said at least one indicating region of said outer sheath, said passive function element having an end with a coupling-in point for light, said passive function element extending along the charging cable and being configured for guiding the light along the charging cable and for scattering The charging cable is suitable for charging an electric or hybrid vehicle, and has a charging line comprising a number of conductors for conducting a charging current of at least 2 A, expediently at least 5 A, preferably at least 10 A. Furthermore, the charging cable has an outer sheath, which surrounds the conductors. A plug connector can be attached to the charging cable, at an end, for the purpose of connecting the charging line to a current source or to the vehicle. Integrated into at least one indicating region of the outer sheath there is a passive function element, which extends along the charging cable and serves to indicate an operating state. Furthermore, at an end the function element has a coupling-in point for light, and is designed for guiding the light along the charging cable and for scattering the light in a radial direction.

The advantages achieved with the invention consist, in particular, in that, for an end user, a particularly easily discernible indication of the operating state is made possible by means of the function element, it being possible to ascertain the operating state in an extremely simple manner, merely by viewing the charging cable. Moreover, owing to the integration of a function element into the charging cable, the indication is particularly compact. The function element extending along the charging cable additionally results in a design of the charging cable that is aesthetically particularly appealing. In addition, owing to the light emitted by the function element, safety in the handling and use of the charging cable is improved, in that the latter is more easily seen, particularly in a dark environment, and consequently a possible tripping hazard is reduced.

The charging line serves to transmit the charging current and to charge an energy storage device, in particular a so-called high-voltage storage device, and is accordingly designed in such a manner that a current suitable for charging an energy storage device of an electric or hybrid vehicle can be transmitted. For this purpose, the charging line comprises a number of conductors, for example 2 to 12 conductors, including, for example, a phase conductor, a neutral conductor and a protective conductor. In addition, it is also possible for the charging line also to have signal or data conductors. For the purpose of protecting against environmental influences, all conductors of the charging line are preferably surrounded by a common charging-line sheath. In particular, the charging line per se is therefore already suitable as a charging cable for an electric or hybrid vehicle. Such conventional charging lines can then also be used, advantageously, as output components, in the sense of a semi-finished product, for producing a charging cable according to the invention, thereby significantly simplify the fabrication of such a charging cable.

Arranged between the charging-line sheath and the outer sheath, expediently, there is a separating layer, in order to ensure improved preassembly of the charging cable. The separating layer is composed, for example, of a liquid separator, e.g. PAT, of talcum or a stearate. Preferably, the separating layer is a fleece. In a first variant, the fleece is wound, incoming longitudinally, around the charging line. In a second variant, the charging line is banded with the fleece.

In order to connect the charging line to the vehicle and/or to the current source, at least one plug connector can be attached, and preferably also is attached, in particular fastened, to the charging line, at an end. For the purpose of establishing a connection, the plug connector is then inserted in an appropriately complementary socket on the current source or on the vehicle. The conductors are additionally surrounded by an outer sheath, which, in particular, thus also surrounds the charging line. In a method for producing the charging cable, it is then possible, advantageously, to use a conventional charging cable as a charging line and develop it accordingly, in that the outer sheath is applied to this charging line. In this case, in particular, the function element is also integrated into the outer sheath. Thus, in particular, the function element is not a part of the charging line, but extends in the charging cable as a whole, outside of the charging line.

The passive function element is integrated into the indicating region of the outer sheath. This indicating region is preferably made of a transparent material, such that light radiated out from the function element passes into the surroundings of the charging cable. In general, transparent is to be understood to mean, in particular, that the material from which the corresponding component is made is transparent to light from the visible spectral range. In an appropriate design, the function element is completely surrounded by the indicating region, and consequently particularly well protected against environmental influences.

Passive is understood to mean, in particular, that the function element itself does not generate light. Preferably, the function element is a, in particular, continuous optical fiber, i.e. an optical fiber. There is thus provided a particularly inexpensive and easily produced function element, which, moreover, is preferably made of a plastic and is thus, for example, a polymer optical fiber, or in short a POF. In an appropriate design, the fiber is made of only one single material. In an appropriate variant, however, the fiber has a core and a cladding of materials of differing refractive index, the cladding having a lesser refractive index than the core. In the case of a design without cladding, the material of the function element is preferably selected in such a manner that its refractive index is greater than the refractive index of the material surrounding the function element, i.e., in particular, of the indicating region. In this way, light guiding is rendered possible along the charging cable and in the function element, because of total reflection at the boundary layer between the function element and the surrounding material. Light that is incident at a particular angle on this boundary layer, within the function element, is then, depending on this angle, either reflected back into the inside of the function element, or exits the function element in a radial direction. Through appropriate selection of the two refractive indices, it is then possible, advantageously, for the amount of light coupled out of the function element to be set according to the requirement.

In the selection of the material for the function element, it is to be taken into account, on the one hand, that this is to be suitable for guiding, in particular, visible light, i.e. is preferably transparent, and on the other hand is suitably combinable with the outer sheath. Preferably, the materials for producing the function element and the outer sheath are also selected in such a manner that, in the assembling of the charging cable during its production, it is possible for the outer sheath to be removed from the function element with as little residue as possible. For example, a fluoroplastic is particularly suitable for making the function element, since it harmonizes particularly well with an outer sheath of, for example, polyurethane.

With regard to the assembly capability, it is also of particular importance that the function element and the outer sheath are not materially bonded to each other in the production of the charging cable. It is thereby ensured that, during production, one material does not fuse as the other material is being applied, and a bond, and a possible unfavorable crushing, bubble formation or even decomposition reaction are avoided. With an accordingly suitable choice of material, however, even fusing is not initially critical. In addition, the function element is preferably also flexible, so as to be able to withstand the mechanical loads that may occur during handling of the charging cable. In order, in particular, to simplify separation of the outer sheath from the function element, the function element, alternatively or additionally, is expediently surrounded by a separator. A suitable material combination is, for example, a fluorinated thermoplastic elastomer, in short FTPE, for the function element with an urethane-based thermoplastic elastomer, in short TPU, for the outer sheath. In principle, however, other suitable combinations are also conceivable.

Furthermore, advantageously, the function element and the outer sheath have approximately the same shrink characteristics, in particular in order to avoid an excessive pinching of the function element upon integration into the outer sheath and, accordingly, to facilitate assembly. On the other hand, a certain amount of shrinkage of the outer sheath with respect to the function element is advantageous in that a clamping effect is thereby achieved, which also, in particular, reduces the risk of formation of air voids or air cushions at the boundary layer between the function element and the outer sheath. Optimally, for this purpose the outer sheath shrinks at least 1.1 times and at most 1.5 times more than the function element.

For the purpose of opacification of the indicating region, an additive is advantageously admixed with the outer sheath in the indicating region. The opacification of the indicating region results in a particularly homogeneous radiation of light, such that a particularly appealing overall impression is produced. Furthermore, any inhomogeneities within the charging cable are concealed by the opacification, and the external appearance is thus further improved. For example, it is possible that, during production, air inclusions are produced between the function element and the outer sheath, and these air inclusions are now no longer visible because of the opacification of the indicating region. Advantageously, the additive also creates scattering centers or impurities in the indicating region, which improve the scattering of the light, and thus the optical effect of the charging cable. The additive is thus used selectively for opacification of the indicating region, and thus constitutes, as it were, an opacifier.

The additive is preferably a hydrolysis stabilizer. Such an additive combines, in particular, a plurality of advantages. On the one hand, a suitable opacification of the indicating region is thus easily achieved, and on the other hand the hydrolysis behavior of the charging cable is also improved at the same time. Suitable hydrolysis stabilizers are, for example, carbodiimides.

In a preferred design, the outer sheath of the charging cable is made of a thermoplastic polyurethane, in short TPE-U. Such a material is characterized by a particular robustness with, at the same time, ease of processing. Moreover, TPE-U is available both in transparent and nontransparent configurations, such that the indicating region and the rest of the outer sheath can be made of the same base polymer and joined to each other in a particularly solid manner.

Particularly charging cables, but also generally cables that are used outside of devices or even in the open, must be appropriately protected against environmental influences. One aspect in this case is the flame resistance of the charging cable, i.e. the resistance of the charging cable under flame exposure. In particular, charging cables that conduct a high current during charging of a vehicle are expediently also provided with an appropriate flame protection system for safety reasons. Such a flame protection system comprises, for example, the admixing of additional flame retardants in the production of the respective cable.

In an appropriate design, a flame retardant that does not exhibit any optical effect is admixed with the indicating region. Such a flame retardant is particularly suitable for realizing a flame protection system for a transparent plastic, since in this case the optical characteristics are not affected at all, or are affected only to a slight extent. In this case, no optical effect is understood to mean, in particular, that the indicating region with admixed flame retardant has an absorption of at most 10% in the visible spectral range. A phosphate based flame retardant is particularly suitable. Likewise suitable is the use of PVC for the indicating region, and preferably also for the outer sheath, since this material is itself sufficiently flame resistant and, moreover, available in a transparent variant. This means that, consequently, in an expedient variant, the material used for the indicating region is itself the flame retardant. The admixing of a further material is then no longer necessary in order to realize a suitable flame protection system.

In a further suitable design, calcium carbonate, i.e., in particular, chalk, is admixed with the outer sheath. The calcium carbonate improves, in particular, the flame protection system of the charging cable. The use of calcium carbonate is particularly advantageous in the case of an outer sheath of TPE-U, which usually liquefies in the case of fire. The addition of calcium carbonate advantageously inhibits this liquefaction, and thereby contributes to an improved flame protection.

In principle, however, the use of any flame retardant is conceivable. However, some flame retardants may possibly have a negative effect upon the optical characteristics of a plastic, in particular in respect of its transparency and the color impression produced. In a preferred design of the charging cable, therefore, admixed with the outer sheath is a flame retardant that has a lesser concentration in the indicating region than in the rest of the outer sheath. Owing to this reduction of the flame retardant concentration in the indicating region, it is then possible to realize an indicating region that is both transparent and sufficiently flame resistant. In particular, a flame retardant is then used in a conventional concentration in what may be the rest of the outer sheath.

Particularly preferred is a design in which the entire outer sheath is the indicating region. The indicating region then completely surrounds the charging line. As a result, on the one hand, the charging cable is realized in a particularly homogeneous manner in respect of the optical effect and is easily visible from all directions, and on the other hand the flame protection are also realized in a correspondingly homogeneous manner, such that the charging cable has uniform flame protection from all directions. Advantageously, there is no need for elaborate multiple systems, in which differing regions of the outer sheath are provided with differing flame retardants.

The full-perimeter realization of the indicating region is particularly advantageous in combination with a hydrolysis stabilizer as an additive in the indicating region, since in this case the charging cable as a whole then has a hydrolysis resistant outer sheath and is thereby well protected against corresponding environmental influences.

In respect of the optical characteristics of the function element, in addition to the above-mentioned selection of the refractive index relative to the refractive index of the outer sheath, in particular the color authenticity in the light guiding along the charging cable is also of particular importance. For light of differing wavelength, i.e. in particular differing color, dispersion effects in the function element result in a correspondingly differing refractive index, and consequently a differing coupling-out behavior at the boundary layer. Starting from the coupling-in point, this possibly results, disadvantageously, in the formation of a color progression along the total length of the function element. In order to keep this effect as small as possible and, in particular, to realize a uniform color appearance over the total length, the function element is preferably made from a material having an Abbe number of at least 30, in particular at least 40. It is thereby possible to produce a particularly homogeneous color impression. The Abbe number in this case describes, in particular, the degree of dispersion, wherein a greater Abbe number corresponds to a lesser dispersion, and thus to a more uniform guiding of light of differing color.

Preferably, the material for the function element is selected, in respect of its Abbe number, in dependence on the length of the function element. In particular, for longer charging cables, a material having a correspondingly higher Abbe number should then be selected.

For the purpose, in particular, of optimally setting that fraction of light that is radiated in a radial direction out of the function element, in an appropriate embodiment a multiplicity of impurities are realized in the function element. During operation, the light guided along the charging cable, in the function element, is then additionally scattered at these impurities and, accordingly, radiated radially. By appropriate design and selection of the quantity of impurities, the ratio of radially scattered light and light that is guided along the function element can then be appropriately set during production. Here, impurities are, for example, additional particles introduced into the function element, which then, in particular, act a scattering centers or scattering particles or, also, inhomogeneities of the material. The introduced particles may be, for example, $TiO_2$, metal powder or metal tinsel. Inhomogeneities of the material are created, for example, by introducing extraneous phases, for example by bubbles, or by thermally induced stresses or micro-cracks in the material.

Alternatively or additionally, in an appropriate development the function element has a surface in which there are incorporated a multiplicity of imperfections. In this way, also, it is appropriately possible for the quantity of light emitted radially by the function element to be set according to the requirement. In the production of the charging cable, the incorporation of the imperfections is preferably effected by means of a temperature treatment, a pressure treatment, a mechanical or chemical treatment, or a combination thereof. Suitable mechanical treatments are, for example, particle blasting, stamping and grinding. A suitable chemical treatment is, for example, etching. Suitable temperature treatments are, for example, laser ablation and melting-on or fusing. All suitable treatments achieve the effect that the treated surface becomes roughened, i.e. its surface roughness is increased and the surface normals vary locally. Consequently, over a wide surface area the critical angle of total reflection is exceeded and light is coupled-out accordingly.

In an appropriate variant, the function element has a core, which is surrounded by a cladding, wherein the latter only partly surrounds the core. For this purpose, the cladding is already only partly applied to the core during production or, alternatively, subsequently removed from the latter.

In a preferred development, additional materials are applied to the outer sheath, whereby, in particular, the outer appearance can advantageously be adapted, particularly in respect of the aesthetic design. Thus, in an appropriate variant, a non-transparent layer, in which a number of openings are made, is applied, in particular extruded, onto the entire outer sheath. These openings preferably form, for example, a pattern or lettering by means of which the charging cable can be adapted to corresponding design requirements. During production, the openings are realized, for example, by stamping, scraping or ablation by means of laser or water jet.

Moreover, the non-transparent layer additionally has the advantage that the outer sheath, and in particular the indicating region, is as far as possible protected against environmental influences. It is also possible in this case, advantageously, to select for the layer a material that is non-combustible or that is not easily combustible, and thus to provide flame protection. In the case of such a charging cable, safety is then increased generally, but also, in particular, in the case of outdoor use.

In a further appropriate variant, non-transparent or light-scattering elements are applied on the indicating region of the outer sheath. These elements are, for example, imprinted, stamped on or applied by means of laser inscription. In a manner similar to the openings already mentioned above, these elements provide further design possibilities for the charging cable.

In a preferred design, in order to increase the light yield in a radial direction, a reflective coating is arranged in a radial direction between the function element and the charging line. By means of this coating, such light that is emitted by the function element in the direction of the charging line is reflected, and is accordingly available for emission in the opposite direction, i.e. outwardly in a radial direction. Consequently, the efficiency of the light emission is thereby further improved.

In a particularly compact and easily produced variant, the reflective coating is a part of the separating layer, already mentioned above, between the charging line, more precisely the charging line sheath, and the outer sheath. For example, a fleece used as a separating layer has a metallic exterior.

Furthermore, there are various appropriate design possibilities in respect of the number of indicating regions and function elements, and the arrangement thereof. Thus, in an appropriate variant, there are a plurality of function elements arranged in the indicating region, which are arranged in a distributed manner in the circumferential direction of the charging cable. The use of a plurality of function elements makes it possible, on the one hand, to provide more light than with only one function element, and on the other hand the appropriate arrangement of the plurality of function elements makes it possible to emit light in a correspondingly large angular range around the charging cable. In particular, the visibility of the charging cable, especially from differing directions, is thereby increased.

In the case of a plurality of function elements, the latter need not necessarily be supplied by a common light source, but instead, advantageously, serve to indicate operating states of differing types; for example, one function element indicates the charge status of the energy storage device, and another function element visualizes the current intensity of the conducted charging current.

In an appropriate variant, a plurality of mutually separate indicating regions, each having at least one function element, are arranged in the circumferential direction. In this case, also, it is possible to cover a corresponding enlarged angular range around the charging cable in respect of an emission of light. This arrangement also makes it possible to increase the overall brightness of the system.

In a further appropriate variant, at least three mutually separate indicating regions, each having at least one function element, are arranged in the manner of a helix. This design, in particular by appropriate illumination of the function element in a particular sequence, makes it possible to realize an optical flow effect having a particular direction, by means of which it is then possible, in particular, to indicate a current flow direction or similar in a particularly simple and optically appealing manner.

In general, a great variety of appropriate arrangements are conceivable: for example, the charging cable has a triangular cross section, wherein an indicating region, having a function element extending therein along the charging cable, is arranged in each of the corners. Also conceivable, alternatively, is a round cross section, in which the charging line extends as a flat conductor between two indicating regions having the form of a segment of a circle. In a likewise appropriate design, the indicating region is realized as a ring segment, and extends either straight along the charging cable or in the manner of a helix around the charging line. It is also possible for the entire charging cable to be designed as a flat cable, in which case the conductors and the function element or the function elements are then arranged in such a manner that they extend in a common plane. In this case, in order to achieve, in particular, a maximum visibility of the function elements, the latter are then preferably arranged externally, i.e. on the perimeter of the charging line.

In a further appropriate variant, the function element is realized as the transparent indicating region of the outer sheath. In this case, the function element is not realized or introduced separately and, accordingly, the indicating region itself is transparent and used as a function element for light guiding and scattering. This design is characterized by particularly simple production.

In an appropriate embodiment, the outer sheath has at least two sub-regions, which are each made from compatible polymers, wherein one of the sub-regions is transparent and serves as an indicating region, and the other of the sub-region is non-transparent. By the selection of compatible polymers for production of the differing sub-regions of the outer sheath, it is possible to achieve a materially bonded connection of the two sub-regions, and thus to make the outer sheath particularly stable. Furthermore, this materially bonded connection facilitates assembly of the charging cable, in that the outer sheath can be separated in one piece, and the sub-regions do not have to be separated individually. Compatible polymers are understood to be, for example: all thermoplastic elastomers, in short TPE, among one another, such as, for example, such that are styrene based, in short TPE-S, ethylene based, in short TPE-E, and urethane based, in short TPE-U. For example, a TPE-S is compatible with a TPE-U. The selection of compatible polymers then simplifies connection of the two sub-regions during production, while the appropriately differing selection of the compatible polymers is effected in respect of the desired optical and technical characteristics.

An outer sheath having a plurality of sub-regions is preferably produced by means of a strip extrusion process. In this case, the indicating region is then produced as a strip extending in the outer sheath and along the charging cable.

In an appropriate variant, or additionally, the non-transparent layer, already mentioned above, which is additionally applied to the entire outer sheath, also serves as a flame protection system. Since this layer completely surrounds the charging cable, apart from the openings made in the latter, a particularly efficient flame protection is also realized by selection of an appropriate flame resistant material for realization of this layer. In particular, in this case it is also possible to dispense with an addition of flame retardants to the outer sheath.

The plug connector of the charging cable is designed, in particular, in conformity with the relevant standards for the design of charging cables for hybrid and electric vehicles. The conductors of the charging line in this case are electrically connected to corresponding terminal contacts in the plug connector. In a preferred design, the function element also terminates in the plug connector, and light, which can be used in or on the plug connector to realize further convenience functions, emerges at the end of the function element. For example, the light emerging at the end can be used to realize a lamp function, in such a manner that the emerging light is used for illumination in the plug-in direction, and the locating of a socket, for example in the dark, is thereby facilitated during handling.

Alternatively or additionally, in an appropriate design a passive lighting element, which is supplied with light by means of the function element, is integrated into the plug connector. In this way, on the one hand, the optical impression of the charging cable can be improved in that, as a result of the plug connector being designed with light of the same color, an appealing, in particular seamless, transition is produced between the plug connector and the cable connecting thereto. For example, the passive lighting element, as also the function element, is made from a transparent plastic and, conveniently, is an appropriate shaped part that is fastened to the plug connector casing or inserted in the latter, and is appropriately visible from outside.

In an advantageous design, integrated into the charging cable or in the plug connector there is a light source, in particular LED, which couples light into the function element via the coupling-in point. In the case of the light source integrated in the plug connector, then, in particular, light does not emerge from the function element, but instead, conversely, in the plug connector light is coupled into the function element. As a result, advantageously, light in the plug connector can also be tapped directly out from the light source for further illumination functions. A lamp function, or also the illumination of a passive lighting element, is then advantageous, independently of the guiding of the light through the function element. The light source is preferably an LED or a combination of a plurality of LEDs, which are characterized by a particularly high efficiency. Also suitable, for example, are organic light-emitting diodes, so-called OLEDs.

For the purpose of controlling the light source in dependence on the operating state, there is preferably a control unit integrated into the charging cable or into the plug connector. In particular, this control unit also determines a respective operating state by appropriate measurements by means of appropriate sensors; for example, the current intensity present in the charging cable is measured.

In order to indicate various operating states of the charging cable in an appropriate manner by means of the function element, the light source preferably has a plurality of color channels, and the color of the generated light is dependent on the operating state. In other words: for the purpose of indicating a particular operating state, the color of the light coupled into the function element is set in an appropriate manner, preferably by means of a control unit for controlling the light source. Particularly suitable for this is an RGB-LED or RGBW-LED, by means of which, in particular, white light can also be generated. Possible operating states are, for example, the charge status of the vehicle energy storage device to be charged, the current conducted by means of the charging cable, or also the voltage used for charging. Depending on the value of the respective parameter, an appropriately different color is then preferably selected. Thus, for example, an embodiment is conceivable such that the charge status of the energy storage device is represented by a color progression from red, for the uncharged state, to green, for the fully charged state. Alternatively or additionally, in a likewise expedient variant, such signals that are transmitted by means of a control, data or signal line that is possibly additionally present in the charging line are visualized by means of the function element.

Preferably, the preceding concepts are also applied to other cables, and not merely to charging cables. In particular, the variants of the cable structure that are described here are also suitable for any type of cable, and enable the stated advantages to be exploited also in other contexts. Particularly in respect of the aforementioned concept of signal visualization by means of the function element, in general the development of a cable by means of such a function element is also advantageous in other contexts. For example, instead of a charging cable, an appropriate cable for signal transmission, for example a sensor cable in the electrical system of a vehicle or on a medical device, is used. In particular, such data that are generated by sensors attached to an end of the cable can thereby be visualized directly, and thus represented in a particularly simple manner.

With the above and other objects in view there is also provided, in accordance with the invention, a charging system for an electric or hybrid vehicle, the charging system comprising:

a charging cable as summarized above and described in detail below, a charging station; a light source for supplying the function element with light; and a control unit for controlling said light source in dependence on the operating state.

The advantages and developments stated above in connection with the charging cable also apply analogously to a charging system for an electric or hybrid vehicle that comprises such a charging cable. The charging system additionally has a charging station, a light source for supplying the function element with light, and a control unit for controlling the light source in dependence on the operating state. Regarding the connection of the charging station and the vehicle by means of the charging cable, various constellations are conceivable: on the one hand, that attached to the charging cable there are two plug connectors, which can be inserted in appropriately complementary sockets on the charging station and on the vehicle; on the other hand, that the charging cable is equipped only with one plug connector and is fixedly connected to the charging station or to the vehicle. The light source in this case is accommodated either in the charging station, in the charging cable itself or in the plug connector attached to the charging cable, but also conceivable in principle is an embodiment in which the light source is installed in the vehicle, or a light source already provided in the vehicle for indication of operating state is used. The control unit also, similarly to the light source, is either integrated directly into the charging cable or accommodated in the plug connector, or is a part of the charging station or of the vehicle.

Other features which are considered as characteristic for the invention are set forth in the appended claims.

Although the invention is illustrated and described herein as embodied in a charging cable for an electric or hybrid vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 3A-3H are cross-sectional, end-on views of various embodiments of the charging cable;

FIG. 4A and FIG. 4B show variants of a function element of the charging cable.

DETAILED DESCRIPTION OF THE INVENTION

Figure 1:
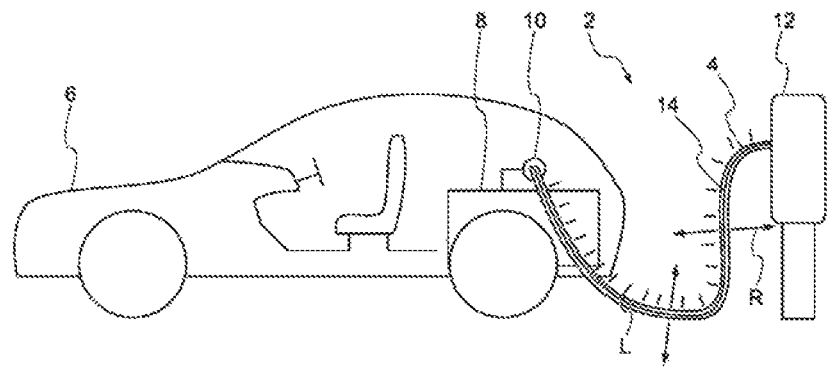
FIG. 1 is a diagrammatic view of a charging system, having a charging cable, for charging a vehicle.

Referring now to the figures of the drawing in detail and first, particularly, to FIG. 1 thereof, there is shown a charging system 2, having a charging cable 4 for charging a vehicle 6. The vehicle is a plug-in hybrid or an electric vehicle. The latter comprises an energy storage device 8, which, in the embodiment variant shown here, is electrically connected to a socket on the vehicle 6. Inserted in this socket there is a plug connector 10 that is attached to an end of the charging cable 4. In the exemplary embodiment shown here, the other end of the charging cable 4 is fixedly connected to a charging station 12. Extending along the charging cable 4 there is a passive function element 14, which is configured to guide light L along the charging cable 4 and to scatter the light L in a radial direction R. In the variant shown here, the operating state is defined by the charge status of the energy storage device 8. In this case, the charge state is visualized, by means of the light L radiated into the surroundings by the function element 14, in that the color of the light L is altered in dependence on the charge state.

Figure 2:
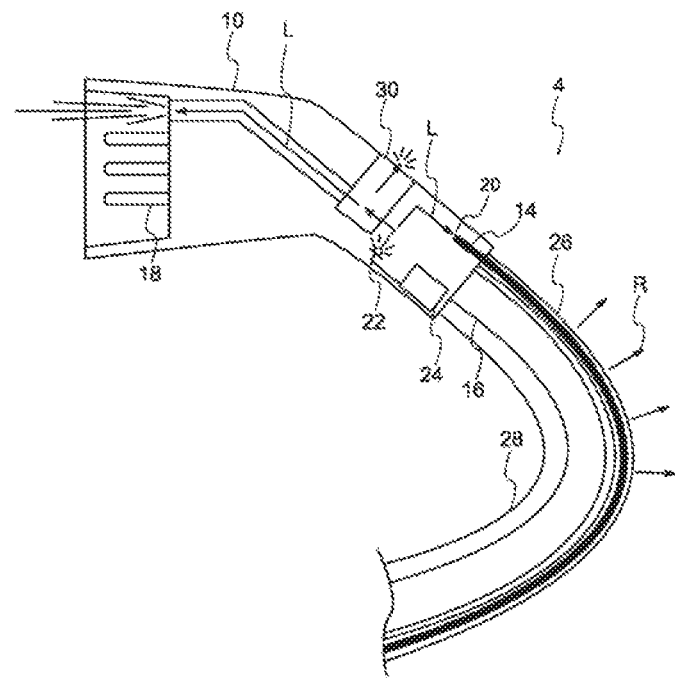
FIG. 2 is a portion of the charging cable of FIG. 1.

FIG. 2 shows an exemplary embodiment of that end of the charging cable 4 to which the plug connector 10 is attached. For the purpose of conducting a charging current, the charging cable 4 comprises a charging line 16, which is connected to terminal contacts 18 in a manner not represented in greater detail here. Extending along the charging cable 4 is the function element 14, which, in the variant shown here, projects partly into the plug connector 10, where it has a coupling-in point 20 for light L. The latter is provided by a light source 22, which is likewise accommodated in the plug connector 10 and which is connected to a control unit 24 for the purpose of control in dependence on the operating state. In an alternative not shown here, by contrast, the light source 22 and the control unit 24 are accommodated in the charging station 12, or even in the vehicle 6. The light L coupled into the function element 14 is, on the one hand, guided along the function element 14 and, on the other hand, partly scattered out from the latter.

In the embodiment shown here, a portion of the light L provided by the light source 22 is additionally used to illuminate a passive lighting element 30, which is integrated into the plug connector 10 and thereby, for a viewer, forms a visual unit between the plug connector 10 and the rest of the charging cable 4 extending out from the latter. In addition, a further portion of the light L is used to realize a lamp function in the region of the terminal contacts 18, thereby simplifying the locating of the socket for insertion in darkness. In the variant shown in FIG. 2, a total of three convenience functions are thus realized by means of the lighting source 22, namely, a lamp function and, respectively, an operating state indication on the plug connector 10 and in the indicating region 26 of the rest of the charging cable 4.

In addition, the function element 14 is integrated into an indicating region 26 of the charging cable 4. Here, this indicating region 26 is made of a transparent material and is a part of an outer sheath 28 of the charging cable 4. In this way, the light L scattered from the function element 14 in a radial direction R, i.e. into the surroundings of the charging cable 4, is visible from outside.

Figure 3A:
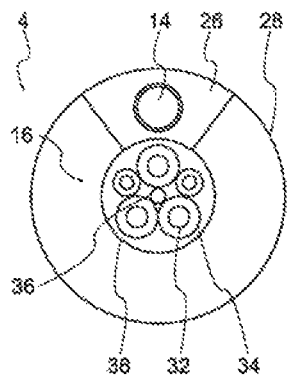
Figure 3B:
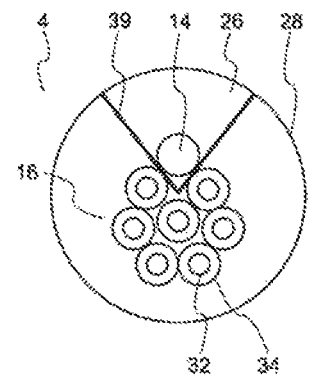

The internal structure of the charging cable 4 is shown particularly clearly in FIGS. 3A to 3H, represented in each of which, in cross section, is a variant of the charging cable 4 of FIGS. 1 and 2. The charging line 16, which in each case comprises a number of conductors 32, is clearly visible. In FIGS. 3A and 3H, the charging line 16 accordingly comprises five conductors 21, which are each surrounded by a conductor sheath 34, and which thus each form a core. These are grouped around a filler element 36. The charging line 16 in FIG. 3B, by contrast, comprises seven conductors 32 with conductor sheaths 34. The charging cables 4 represented in FIG. 3C to 3G each have charging lines 16 having four conductors 32 and corresponding conductor sheaths 34. Furthermore, the conductors 32 of the charging lines 16 in the examples of FIGS. 3A, 3E, 3F and 3H are additionally grouped together by means of a charging line sheath 38.

In FIG. 3A to 3H, admixed with the indicating region 26, in particular, is a hydrolysis stabilizer, as an additive, in order to realize a special opacification of the indicating region that results overall in a better scattering of the light L, and outwardly results in a more homogeneous visual impression. Unlike a fully transparent indicating region 26, an opacified indicating region 26 also conceals non-uniformities that, in principle, may occur in the production of the charging cable 4.

Figure 3C:
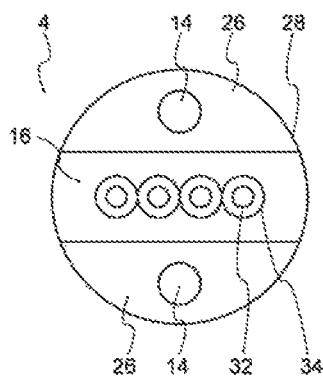

The respective charging line 16 is then further surrounded by the outer sheath 28. The function element 14 is integrated into the indicating region 26 thereof. In this case, in FIG. 3A, the indicating region 26 is realized in cross section in the form of a ring segment, and in the form of a circle segment in FIG. 3B. In this case, in the exemplary embodiment of FIG. 3B, there is additionally a reflective coating 39 arranged between the function element 14 and the charging line 16. Here, this coating is introduced at the boundary between the indicating region 26 and the rest of the outer sheath 28. In FIG. 3C, the outer sheath 28 comprises two indicating regions 26, integrated in each of which there is a function element 14. In the exemplary embodiments of FIG. 3D, the entire outer sheath 28 is realized as an indicating region 26, integrated in which there are four function elements 14, which are distributed uniformly in the circumferential direction U. By appropriate clocking, the four function elements 14, in particular, are switched on in time succession in such a manner that a flow effect, and thus the impression of a flow direction, is produced. In FIG. 3E, the indicating region 26 is realized in the manner of a tube and as an external ring in cross section. In this case, the indicating region is the same as the function element 14, and thus forms a lighting tube. In FIGS. 3F and 3G, non-circular cross sections are represented. Thus, FIG. 3F shows a triangular cross section, in which the centrally routed charging line 16 is surrounded by three indicating regions 26 that are each respectively located in a corner of the triangle. A respective function element 14 is then accommodated in each of these indicating regions 26. The charging cable 4 of FIG. 3G is realized as a flat cable, in which the conductors 32 of the charging line 16 are arranged in a common plane with the, in this case, two function elements 14. The charging line 16 in this case is arranged between the two function elements 14. In FIG. 3H, as also in FIG. 3D, the entire outer sheath 28 is realized as an indicating region 26, and there is a single function element 14 inserted in the latter. In this case, the indicating region 26 is arranged in the form of a tube around the charging line 16, in a manner similar to the outer sheath 28 in FIG. 3A. This has the particular advantage that light L is emitted in all directions, and the charging cable 4 is clearly visible from all directions.

In all of the variants represented here, the charging line 16 is arranged centrally, or at least symmetrically, in respect of the cross section of the charging cable 4. However, in variants that are likewise appropriate, but not shown here, the charging line 16 does not run centrally, but eccentrically. In particular, it is also possible for the charging line 16 to follow a helical course.

Figure 3D:
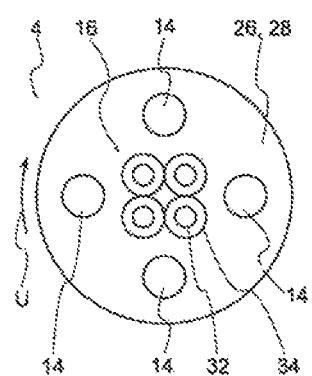

With the exception of the variant shown in FIGS. 3D and 3H, the outer sheath 28 in each case is formed from two sub-regions, the one sub-region comprising any indicating regions 26 of the respective charging cable 4, and the other sub-region comprising the rest of the outer sheath 28. In the embodiments shown here, both sub-regions are made from a plastic having the same base polymer, the respective indicating region 26 being made from a transparent variant of the plastic, and the rest of the outer sheath 28 being made from a non-transparent variant. Furthermore, admixed with the outer sheath 28 is a flame retardant, which is not represented in greater detail here, but which is present in reduced concentration in the indicating region 26, in order, in particular, not to disadvantageously affect the transparent characteristics thereof. In FIG. 3D, the complete outer sheath 28 is made from a transparent material, and thus in its entirety forms the indicating region 26.

The function element 14 is realized as an optical fiber, with exception of the design according to FIG. 3E, in which the function element 14 is a tube. In each case, the function element 14 guides the light L, coupled into the latter, on the basis of the principle of total reflection. For this purpose, the material that surrounds the function element 14 is selected in such a matter that it has a lesser refractive index than the function element 14 itself. Thus, for example in FIG. 3A, the function element 14 is realized as an optical fiber having a core 14a and a cladding 14b. The latter in this case has a lower refractive index than the core 14a. In FIG. 3E, the function element 14 is surrounded directly by air, which likewise has a lesser refractive index than the corresponding material. In the rest of the figures, the function element 14 is embedded as a single fiber into a respective indicating region 26, which, accordingly, is made from a material having a lesser refractive index.

Figure 4B:
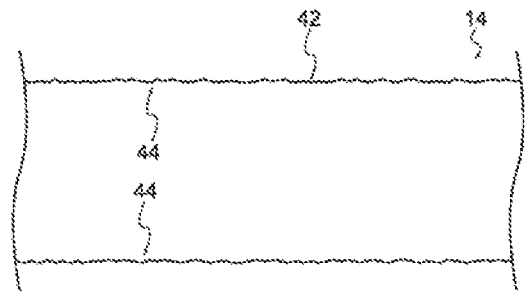

FIGS. 4A and 4B each show a detail of a variant of the function element 14. FIG. 4A in this case shows a function element 14 having a core 14a and a cladding 14b, for example for a charging cable 4 according to the variant of FIG. 3A. Moreover, in the embodiment shown here, introduced in the core 14a there are additional impurities 40, at which light L, which is guided by means of the core 14a, is scattered and emitted in a radial direction r from the function element 14. It is then possible, by appropriate design of these impurities 14, to set the amount of scattered light according to the requirement.

FIG. 4B shows an alternative function element 14, which is likewise realized as a fiber, having a surface 32 in which there are incorporated a multiplicity of imperfections 44. By means of such imperfections 44, also, it is possible to set the scattering of the light L according to the requirement. For the purpose of producing such imperfections 44, during the production of the function element 14 the surface 42 is subjected, in particular, to an additional temperature treatment and/or pressure treatment. Furthermore, it is also possible to set the scattering characteristics of the function element 14 in that, in a variant not represented here, a portion of the cladding 14s is subsequently removed.

Figure 5A:
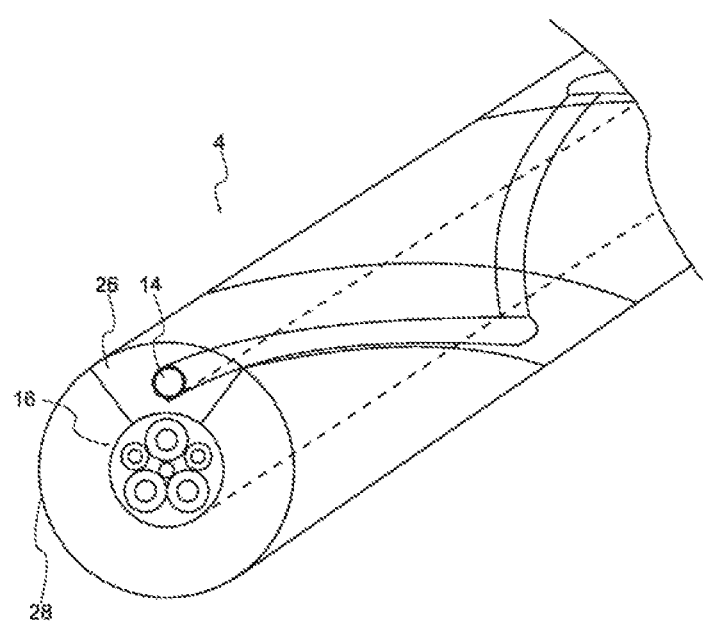
FIGS. 5A-5C are perspective and cross-section views showing details of variants of the charging cable.
Figure 5B:
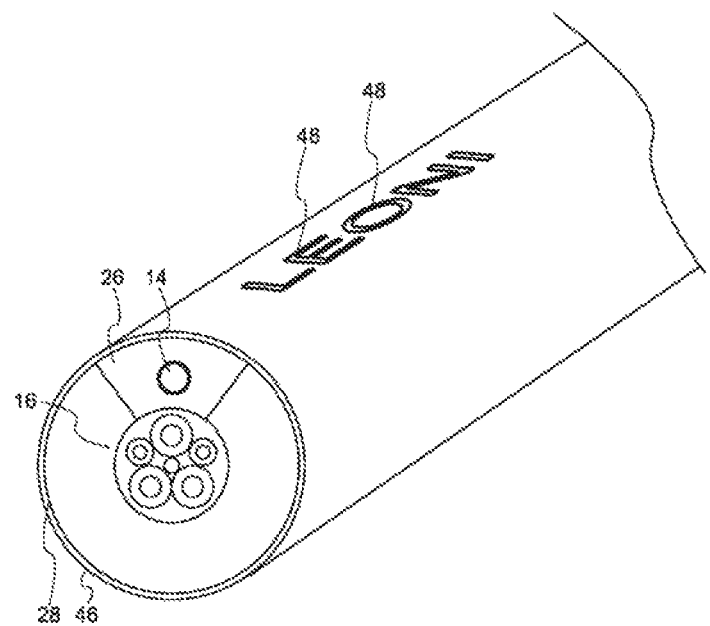
Figure 5C:
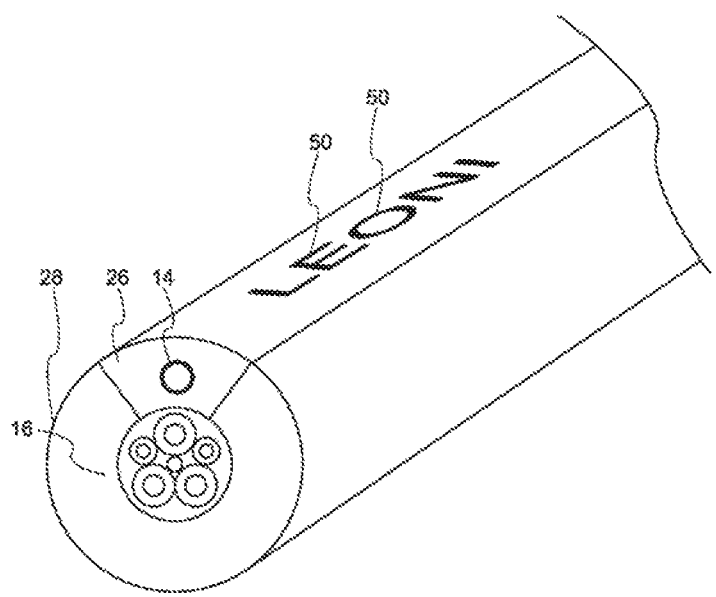

FIG. 5A to 5C each show a portion of a variant of the charging cable 4, in an oblique view. In this case, 5A shows an exemplary embodiment in which the indicating region 26 and the function element 14 integrated therein extend in the manner of a helix in the longitudinal direction of the charging cable 4 and around the charging line 16. In this way, an increased visibility of the function element 14 is realized. In the exemplary embodiment of FIG. 5B, the outer sheath 28 is additionally surrounded by a non-transparent layer 46. A number of openings 48, which in this case form lettering, are made therein (the exemplary lettering shows LEONI®, a registered trademark of the applicant). The openings 48 in this case are made in that portion of the layer 46 that covers the indicating region 26, such that light L can emerge outwardly from the openings 48. By contrast, FIG. 5C shows a variant in which, applied on the outside of the indicating region 26 in a radial direction R there are additional elements 50, which likewise constitute lettering and which either have a scattering effect or are not transparent. For example, such elements 50 are imprinted, stamped or applied to the indicating region 26 by means of laser inscription. Particularly from FIGS. 5B and 5C it is clear that the additional openings 48 shown therein, in a non-transparent layer 46, or corresponding light-influencing elements 50, render possible a multiplicity of design options.

The following is a summary list of reference numerals and the corresponding structure used in the above description of the invention:

2 charging system
4 charging cable
6 vehicle
8 energy storage device
10 plug connector
12 charging station
14 function element
14a core
14b cladding
16 charging line 18 terminal contact
20 coupling-in point
22 light source
24 control unit
26 indicating region
28 outer sheath
30 passive lighting element
32 conductor
34 conductor sheath
36 filler element
38 charging line sheath
39 reflective coating
40 impurity
42 surface
44 imperfection
46 layer
48 opening
50 element
L light
R radial direction
U circumferential direction

The invention claimed is:

1. A charging cable for an electric or hybrid vehicle, the charging cable comprising:
a charging line including a plurality of conductors for conducting a charging current of at least 2 A;
an outer sheath surrounding said conductors, said outer sheath having at least one indicating region being a strip;
a cable end for attachment of a plug connector connecting the charging line to a current source or to the vehicle; and
a passive function element for indicating an operating state integrated into said at least one indicating region of said outer sheath, said passive function element having an end with a coupling-in point for light, said passive function element extending along the charging cable and being configured for guiding the light along the charging cable and for scattering the light in a radial direction; and
a flame retardant admixed with said outer sheath, said flame retardant being admixed in said indicating region with a lesser concentration than in a remainder of said outer sheath;
said outer sheath including at least a first sub-region made from a plastic having a base polymer and a second sub-region made from a plastic having said base polymer;
one region selected from the group consisting of said first and second sub-regions being transparent and serving as said indicating region, and another region selected from the group consisting of said first and second sub-regions being nontransparent.

2. The charging cable according to claim 1, which comprises an additive admixed with said outer sheath in said indicating region for opacifying said indicating region.

3. The charging cable according to claim 2, wherein said additive is a hydrolysis stabilizer.

4. The charging cable according to claim 1, wherein said outer sheath is made from a thermoplastic polyurethane.

5. The charging cable according to claim 1, which comprises a flame retardant, which does not exhibit any optical effect, admixed with said indicating region.

6. The charging cable according to claim 1, which comprises calcium carbonate admixed with said outer sheath.

7. The charging cable according to claim 1, wherein said indicating region comprises an entirety of said outer sheath.

8. The charging cable according to claim 1, wherein said function element is made of a material having an Abbe number of at least 30, for producing a homogeneous color impression.

9. The charging cable according to claim 1, wherein said function element contains a multiplicity of impurities for scattering light.

10. The charging cable according to claim 1, wherein said function element has a surface with a multiplicity of imperfections incorporated therein.

11. The charging cable according to claim 1, which comprises a non-transparent layer, formed with a plurality of openings, disposed on said outer sheath.

12. The charging cable according to claim 11, wherein said non-transparent layer is an extruded layer formed over the entire said outer sheath.

13. The charging cable according to claim 1, which comprises non-transparent or light-scattering elements are arranged on said indicating region of said outer sheath.

14. The charging cable according to claim 1, which comprises a reflective coating disposed in a radial direction between said function element and said charging line.

15. The charging cable according to claim 1, wherein said function element is one of a plurality of function elements arranged in said indicating region, and said function elements are distributed about a circumferential direction of the charging cable.

16. The charging cable according to claim 1, wherein said function element is said at least one indicating region of said outer sheath.

17. The charging cable according to claim 1, which further comprises a light source integrated into the charging cable or into the plug connector, said light source being disposed to couple light into said function element via said coupling-in point.

18. The charging cable according to claim 17, which further comprises a control unit integrated into the charging cable or into the plug connector, said control unit controlling said light source in dependence on the operating state.

19. The charging cable according to claim 17, wherein said light source has a plurality of color channels, and a color of the light generated by said light source is dependent on the operating state.

20. A charging system for an electric or hybrid vehicle, the charging system comprising:
a charging cable according to claim 1;
a charging station;
a light source for supplying the function element with light; and
a control unit for controlling said light source in dependence on the operating state.

21. The charging cable according to claim 1, wherein said first sub-region and said second sub-region are materially bonded together.

22. A charging cable for an electric or hybrid vehicle, the charging cable comprising:
a charging line including a plurality of conductors for conducting a charging current of at least 2 A;
an outer sheath surrounding said conductors, said outer sheath having at least one indicating region;
a cable end for attachment of a plug connector connecting the charging line to a current source or to the vehicle;
a passive function element for indicating an operating state integrated into said at least one indicating region of said outer sheath, said passive function element having an end with a coupling-in point for light, said passive function element extending along the charging cable and being configured for guiding the light along the charging cable and for scattering the light in a radial direction, said passive function element having a surface with a multiplicity of imperfections incorporated therein;

a flame retardant admixed with said outer sheath, said flame retardant being admixed in said indicating region with a lesser concentration than in a remainder of said outer sheath; and a non-transparent layer, formed with a plurality of openings, disposed on said outer sheath;

said outer sheath including at least a first sub-region made from a plastic having a base polymer and a second sub-region made from a plastic having said base polymer;

one region selected from the group consisting of said first and second sub-regions being transparent and serving as said indicating region, and another region selected from the group consisting of said first and second sub-regions being nontransparent.

* * * * *